US008565610B2

(12) United States Patent
Sprague et al.

(10) Patent No.: US 8,565,610 B2
(45) Date of Patent: Oct. 22, 2013

(54) MAINTAINING CORRELATED VIRTUAL DATA STREAMS THROUGH A NETWORK

(75) Inventors: Edward Sprague, Woodside, CA (US); Charles H. Joyner, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 934 days.

(21) Appl. No.: 12/141,323

(22) Filed: Jun. 18, 2008

(65) Prior Publication Data

US 2009/0034976 A1 Feb. 5, 2009

Related U.S. Application Data

(60) Provisional application No. 60/944,776, filed on Jun. 18, 2007.

(51) Int. Cl.
*H04B 10/00* (2013.01)

(52) U.S. Cl.
USPC ................ 398/158; 398/159; 398/81; 398/79

(58) Field of Classification Search
USPC ........... 398/74, 79, 99, 98, 75, 35, 33, 81, 82, 398/158, 159, 147, 41–72
See application file for complete search history.

(56) References Cited

U.S. PATENT DOCUMENTS 6,072,614 A * 6/2000 Roberts ......................... 398/177
7,065,103 B1 6/2006 Gagnon et al.
7,245,836 B2 * 7/2007 Mitsu et al. .................. 398/158
7,251,416 B1 * 7/2007 Tamil et al. ..................... 398/47
7,260,327 B1 * 8/2007 Shin et al. ....................... 398/51
7,272,309 B1 * 9/2007 Tamil et al. ..................... 398/47
7,453,824 B1 * 11/2008 Nucci et al. ................... 370/254
2002/0154360 A1 * 10/2002 Liu ............................... 359/135
2003/0185229 A1 * 10/2003 Shachar et al. ............... 370/460
2004/0037330 A1 * 2/2004 Ohkuma ........................ 370/535
2004/0208555 A1 * 10/2004 Pau et al. ........................ 398/56
2006/0153496 A1 * 7/2006 Tanobe et al. .................. 385/24

FOREIGN PATENT DOCUMENTS

WO WO 2004/012371 2/2004

OTHER PUBLICATIONS

Shenai et al., "Analysis of IP grooming approaches in optical WGM mesh networks," Global Telecommunications Conference, 2005, pp. 2118-2122.
Parthiban et al., "Waveband grooming and IP aggregation in optical networks" Journal of Lightwave Technology, vol. 21, No. 11, Nov. 1, 2001, pp. 2476-2488.

* cited by examiner

*Primary Examiner* — M. R. Sedighian
(74) *Attorney, Agent, or Firm* — Ross M. Carothers; David L. Soltz

(57) ABSTRACT

Embodiments of the invention are described in which correlated virtual data streams are managed within an optical network connection. In certain embodiments of the invention, a client signal is allocated across a plurality of transport wavelength channels according to various transposition methods. The assignment of portions of the client signal to corresponding wavelengths may depend on various factors including channel utilization within the transport network and skew characteristics between particular wavelengths.

16 Claims, 5 Drawing Sheets

MAINTAINING CORRELATED VIRTUAL DATA STREAMS THROUGH A NETWORK

CROSS REFERENCE TO RELATED PATENT APPLICATIONS

This application claim priority to U.S. Provisional Application Ser. No. 60/944,776, entitled "Maintaining Correlated Virtual Data Streams Through a Network," filed Jun. 18, 2007, which application is incorporated herein by reference in its entirety.

BACKGROUND

A. Technical Field

This invention relates generally to optical transport networks, and more particularly to the maintenance of correlated virtual data streams within a network.

B. Technical Field

High-speed, long-haul transport networks are able to communicate large amounts of information across significantly large distances. These networks transmit this information within the optical domain by modulating one or more optical signals. These optical signals may have different wavelengths and can be multiplexed together into a wave-division multiplexed optical signal, which is transported between a long-haul transmitter and receiver using optical fiber.

FIG. 1 illustrates an exemplary transport connection 100 between a long-haul transmitter 110 and receiver 120 that carries multiple channels or signals at different wavelengths (e.g., 130, 135) for optically communicating information from the transmitter 110 to the receiver 120. Connection 100 may include one or more optical fibers.

A transport network is oftentimes unable to efficiently use the available bandwidth within one or more of the channels in the transport system. For example, first channel 130 may be carrying client data at a rate (e.g., 2.5 Gbps) that is significantly slower than the capacity of channel 130 (e.g., 10 Gbps) which results in an under-utilization of the channel bandwidth and wasted capacity. Such wasted capacity not only reduces the efficiency of the transport network but also introduces additional cost to the customer and/or network provider.

In another example, the first channel 130 and a second channel 135 may collectively carry client data at a rate that exceeds the capacity of either channel individually. Such transmission on two wavelengths may also introduce inefficiencies depending on the rates of the client data and transport channels. For example, the first 130 and second 135 channels may each have a capacity of 10 Gbps, but collectively transmit client data at 15 Gbps, thereby resulting in wasted bandwidth in either one or both of the channels.

The cost of inefficient bandwidth use within a transport system is absorbed by either a customer, who must pay for the unused capacity, or a service provider who is unable to monetize the unused capacity. Additionally, this relationship between a client data rates and transport channel capacity is often static, such that bandwidth allocation is difficult to change with changing network conditions.

SUMMARY OF THE INVENTION

Embodiments of the invention are described in which correlated virtual data streams are managed within an optical network connection. In certain embodiments of the invention, a client signal is allocated across a plurality of transport wavelength channels according to various transposition methods. The assignment of portions of the client signal to corresponding wavelengths may depend on various factors including channel utilization within the transport network and skew characteristics between particular wavelengths.

A transposition function module may be positioned on one or more intermediary nodes within an optical connection. The transposition function module maps information on a plurality of ingress ports to optical signals or time-slots of such optical signals on a plurality of egress ports, wherein the optical signals may have different wavelengths. This mapping effectively allows the transposition function module to distribute or re-distribute data on different wavelengths within an optical connection. This transposition or distribution allows network traffic to be adjusted within a connection to compensate for skew, improve bandwidth utilization, respond to failure events, or be dynamically adjusted relative to other parameters within a network connection. In certain embodiments, this transposition is performed as a fixed time-slot distribution. In yet other embodiments, this transposition is performed as a cell or packet distribution.

The transposition function module may be integrated with other functional modules within a network node. For example, the transposition function module may be integrated with a switching module which would allow traffic transposition and switching to be performed within the same component. One skilled in the art will recognize that other functions may be integrated into or with the transposition function module.

An optical network connection may also comprise one or more signaling channels that manage transposition function modules within the connection. These signaling channels allow communication between a transmitter, transposition function module(s), or receiver. Furthermore, the optical network connection may comprise a forward signaling channel and a reverse signaling channel which allows for control data to be communicated in both directions of the connection.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
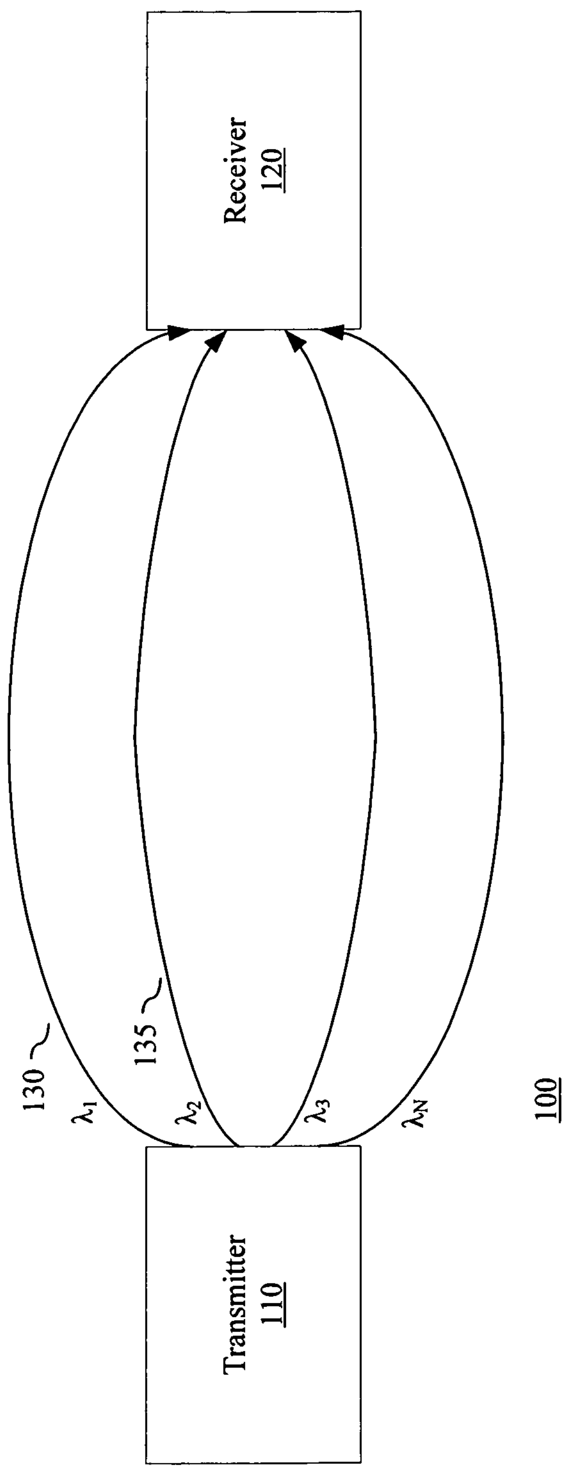
FIG. 1 is a prior art illustration of an optical connection between a transmitter and a receiver.

The following description is set forth for purpose of explanation in order to provide an understanding of the invention.

However, it is apparent that one skilled in the art will recognize that embodiments of the present invention, some of which are described below, may be incorporated into a number of different networking environments, architectures and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Embodiments of the present invention provide a wavelength division multiplexed (hereinafter, "WDM") digital optical network that operates by converting transmitted data from an optical transmission format to an electrical format as it is received at each network node. At each node, the data may be dropped for local distribution or retransmitted on any wavelength ($\lambda_i$) available to the network from that node. Each node may have any number of wavelengths operating at any data rate. For example, a node may contain between one to hundreds of wavelengths operating at data rates ($R_i$) of 2.5 GB/s to 100's of Gb/s data transfer rates on each wavelength.

In these various embodiments, a virtual data stream (hereinafter, "VDS") is generated whose size may (or may not) exceed the maximum data capacity of any one transmission wavelength ($\lambda_i$). A VDS is a data stream that is allocated on multiple wavelength channels within the digital optical network and these multiple wavelength channels are correlated to each other so that the data stream may be subsequently reconstructed. The VDS may be transmitted through a network independent of the number of channels ($\lambda_i$s) or fibers or data terminals used to transmit the data. The information in the channels is correlated to allow subsequent reconstruction of the VDS at a receiving node. For minimizing routing delays resulting in timing skew, it may be desirable to have certain composite fragments of the virtual data stream (VDS) travel in the same fiber.

In certain networks, data is converted from the optical domain to the digital domain at each node which allows the available capacity in a wavelength channel(s) to be known at another node(s) within the network. As a result, a WDM digital optical network may use this known available capacity in a wavelength channel(s) to improve utilization of the entire bandwidth of a wavelength(s) ($\lambda_i$) in creating a virtual data stream.

For example, that transmission of a virtual data stream of 100 Gb/s information content may be transported across a network, in which the digital network architecture has 80 wavelengths ($\lambda_1$ to $\lambda_{80}$) that are available. In this example, the maximum data rate for transmission over any one channel in the network is 40 Gb/s. The transmission of the 100 Gb/s information provides that between any two nodes:

$$\Sigma_0^{80}(\lambda_I * R_i^{VDS})=100 \text{ Gb/s, where } R_i^{VDS} \text{ is a subset of } R_i \text{ for each } \lambda_i.$$

In some digital WDM networks, capacity may be allocated at the smallest granularity (say units of 2.5 Gb/s for example) across the network of wavelengths available to accomplish the required aggregate capacity of the virtual data stream. All or any portion of the entire capacity of any one wavelength ($\lambda_i$) may be used between any two nodes in providing and adding to the total VDS.

To illustrate this point, several two-node connection examples (links) are described in which the VDS is handed off consecutively to each link.

In a first example, capacity is evenly distributed across a plurality of wavelengths. This distribution may result in complete utilization of the wavelengths or portions thereof. If a 100 Gb/s VDS is distributed evenly across 10 Gb/s channels, then the following bandwidth allocation would result:

Channel 1 having wavelength $\lambda_1$ carries 10 Gb/s, channel 2 having wavelength $\lambda_2$ carries 10 Gb/s, channel 3 having wavelength $\lambda_3$ carries 10 Gb/s, channel 4 having wavelength $\lambda_4$ carries 10 Gb/s, channel 5 having wavelength $\lambda_5$ carries 10 Gb/s, channel 6 having wavelength $\lambda_6$ carries 10 Gb/s, channel 7 having wavelength $\lambda_7$ carries 10 Gb/s, channel 8 having wavelength $\lambda_8$ carries 10 Gb/s, channel 9 having wavelength $\lambda_9$ carries 10 Gb/s, and channel 10 having wavelength $\lambda_{10}$ carries 10 Gb/s; for an aggregate VDS of 100 Gb/s.

In this first example, each channel has 40 Gb/s total capacity of which 30 Gb/s is not used by the VDS.

In a second example, capacity is not evenly distributed across a plurality of wavelengths. This distribution may result in complete utilization of some of the wavelengths and other wavelengths not operating at full capacity. In this example, if a 100 Gb/s VDS is distributed across three 40 Gb/s wavelengths, then the following bandwidth allocation would result:

Channel 1 carries 40 Gb/s, channel 2 carries 40 Gb/s, and channel 3 carries 20 Gb/s for an aggregate VDS of 100 Gb/s.

In this second example, the entire capacity of channels 1 and 2 are used to create the VDS, while channel 3 still has 20 Gb/s of capacity remaining that is not used for the VDS.

In a third example, capacity is distributed across a maximum number of wavelengths within a particular connection. If a 100 Gb/s VDS is distributed evenly across forty 10 Gb/s wavelengths, then the following bandwidth allocation would result:

Channel 80 carries 2.5 Gb/s, channel 79 carries 2.5 Gb/s, channel 78 carries 2.5 Gb/s, channel 77 . . . channel 41 carries 2.5 Gb/s, for an aggregate VDS of 100 Gb/s.

In this case each channel has a total of 40 Gb/s capacity, of which 37.5 Gb/s is not used by the VDS.

If the virtual data stream (VDS) exceeds the capacity of one fiber, the data stream may be spread among two or more optical fibers ($F_x$) extending between first and second nodes. The following examples illustrate allocation of a VDS over multiple fibers.

In a first example, a 100 Gb/s VDS is allocated such that the capacity is evenly distributed over different 40 Gb/s channels such that:

Channel 1 transmitted on fiber 1 carries 10 Gb/s, channel 2 transmitted on fiber 2 carries 10 Gb/s, channel 3 transmitted on fiber 3 carries 10 Gb/s, channel 4 transmitted on fiber 4 carries 10 Gb/s, channel 5 transmitted on fiber 5 carries 10 Gb/s, channel 6 transmitted on fiber 6 carries 10 Gb/s, channel 7 transmitted on fiber 7 carries 10 Gb/s, channel 8 transmitted on fiber 8 carries 10 Gb/s, channel 9 transmitted on fiber 9 carries 10 Gb/s, channel 10 transmitted on fiber 10 carries 10 Gb/s.

In this first example, each channel named on each separate fiber has 40 Gb/s available capacity, of which 30 Gb/s not is not used by the VDS.

In a second example, a 100 Gb/s VDS is allocated such that the capacity is evenly distributed but using the same wavelength on different fibers such that:

Channel 1 transmitted on $\lambda_1$ in fiber 1 carries 10 Gb/s, channel 1 transmitted on $\lambda_1$ in fiber 2 carries 10 Gb/s, channel 1 transmitted on $\lambda_1$ in fiber 3 carries 10 Gb/s, channel 1 transmitted on $\lambda_1$ in fiber 4 carries 10 Gb/s, channel 1 transmitted on $\lambda_1$ in fiber 5 carries 10 Gb/s, channel 1 transmitted on $\lambda_1$ in fiber 6 carries 10 Gb/s, channel 1 transmitted on $\lambda_1$ in fiber 7 carries 10 Gb/s, channel 1 transmitted on $\lambda_1$ in fiber 8 carries 10 Gb/s, channel 1 transmitted on $\lambda_1$ in fiber 9 carries 10 Gb/s, channel 1 transmitted on $\lambda_1$ in fiber 10 carries 10 Gb/s; for an aggregate VDS of 100 Gb/s.

In this second example, each channel $\lambda_1$ on each fiber has 40 Gb/s capacity, of which 30 Gb/s is not used by the VDS.

In a third example, a 100 Gb/s VDS is allocated such that the capacity of two 40 Gbs channels (e.g., channel 12 on fiber F1 and channel 55 on fiber F2) is fully utilized while a third channel on a third fiber (e.g., channel 1 on fiber F3) carries data at a rate 20 Gbs. In this case the entire capacity of channels 12 and 55 on fibers $F_1$ and $F_2$ are used to help create the VDS, while channel 1 on fiber $F_3$ still has 20 Gb/s of capacity remaining that is not used for the VDS.

In a fourth example, a 100 Gb/s VDS is allocated across channels and fiber to maximize its distribution. For example, as shown below:

$F_1\lambda_{80}$ carries 2.5 Gb/s, $F_2\lambda_{79}$ carries 2.5 Gb/s, $F_3\lambda_{78}$ carries 2.5 Gb/s, $F_4\lambda_{77}$ carries 2.5 Gb/s, $F_5\lambda_{76}$ carries 2.5 Gb/s, $F_6\lambda_{75}$ carries 2.5 Gb/s, $F_7\lambda_{74}$ carries 2.5 Gb/s, $F_8\lambda_{73}$ carries 2.5 Gb/s, $F_9\lambda_{72}$ carries 2.5 Gb/s, $F_{10}\lambda_{71}$ carries 2.5 Gb/s $F_{11}\lambda_{70}$ carries 2.5 Gb/s, $F_{12}\lambda_{69}$ carries 2.5 Gb/s, $F_{13}\lambda_{68}$ carries 2.5 Gb/s, $F_{14}\lambda_{67}$ carries 2.5 Gb/s, $F_{15}\lambda_{66}$ carries 2.5 Gb/s, $F_{16}\lambda_{65}$ carries 2.5 Gb/s, $F_{17}\lambda_{64}$ carries 2.5 Gb/s, $F_{18}\lambda_{63}$ carries 2.5 Gb/s, $F_{19}\lambda_{62}$ carries 2.5 Gb/s, $F_{20}\lambda_{61}$ carries 2.5 Gb/s $F_{21}\lambda_{60}$ carries 2.5 Gb/s, $F_{22}\lambda_{59}$ carries 2.5 Gb/s, $F_{23}\lambda_{58}$ carries 2.5 Gb/s, $F_{24}\lambda_{57}$ carries 2.5 Gb/s, $F_{25}\lambda_{56}$ carries 2.5 Gb/s, $F_{26}\lambda_{55}$ carries 2.5 Gb/s, $F_{27}\lambda_{54}$ carries 2.5 Gb/s, $F_{28}\lambda_{53}$ carries 2.5 Gb/s, $F_{29}\lambda_{52}$ carries 2.5 Gb/s, $F_{30}\lambda_{51}$ carries 2.5 Gb/s $F_{31}\lambda_{50}$ carries 2.5 Gb/s, $F_{32}\lambda_{49}$ carries 2.5 Gb/s, $F_{33}\lambda_{48}$ carries 2.5 Gb/s, $F_{34}\lambda_{47}$ carries 2.5 Gb/s, $F_{35}\lambda_{46}$ carries 2.5 Gb/s, $F_{36}\lambda_{45}$ carries 2.5 Gb/s, $F_{37}\lambda_{44}$ carries 2.5 Gb/s, $F_{38}\lambda_{43}$ carries 2.5 Gb/s, $F_{39}\lambda_{42}$ carries 2.5 Gb/s, $F_{40}\lambda_{41}$ carries 2.5 Gb/s, where $F_x$ represents the physical fiber and $\lambda_y$ is the optical channel within the fiber.

In this case, each channel has a capacity of 40 Gb/s of which 37.5 Gb/s is not associated with this VDS.

All of the above examples are intended to be representative of VDS implementations in a network, and are not exclusive. The unused portions or the channels may be used to transport data that is unrelated or non-correlated to the VDS.

Figure 2A:
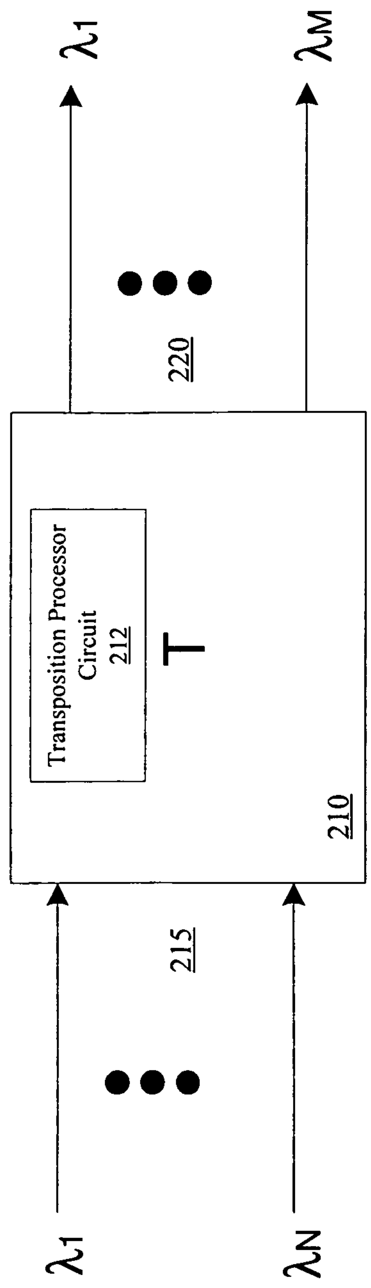
FIG. 2A is a general illustration of a transposition function module according to various embodiments of the invention.

FIG. 2A shows a transposition function module (T) that transposes between multi-wavelength distributions of the VDS according to various embodiments of the invention. The transposition module 210 has one or more ingress interfaces 215 on which one or more ingress optical signals having different wavelengths are received. In certain embodiments of the invention, electrical signals associated with one or more optical channels within a network may be supplied to ingress interfaces 215. The transposition module 210 also has one or more egress interfaces 220 on which one or more egress optical signals having different wavelengths are output. In certain embodiments of the invention, these egress channels are also electrical signals associated with one or more optical channels within the network.

A VDS carried by $\lambda_1$ through $\lambda_N$ is reformatted by the transposition function module 210 such that the VDS is carried on $\lambda_1$ through $\lambda_M$. In certain embodiments, the transposition function module 210 comprises a processor circuit 212 that maps ingress wavelength channels to egress wavelength channels. In other embodiments of the invention, the transposition processor circuit 212 may map portions of an ingress wavelength channel to a portion of an egress wavelength channel. This mapping of channels or portions of channels allows the network to more effectively manage channel bandwidth. For example, traffic may be inserted within unused capacity of a particular channel in order to increase the utilization of the particular channel. Additionally, this mapping of channels or portions of channels may also provide a mechanism in which skew, or inter-channel latency, is compensated across one or more links.

Figure 2B:
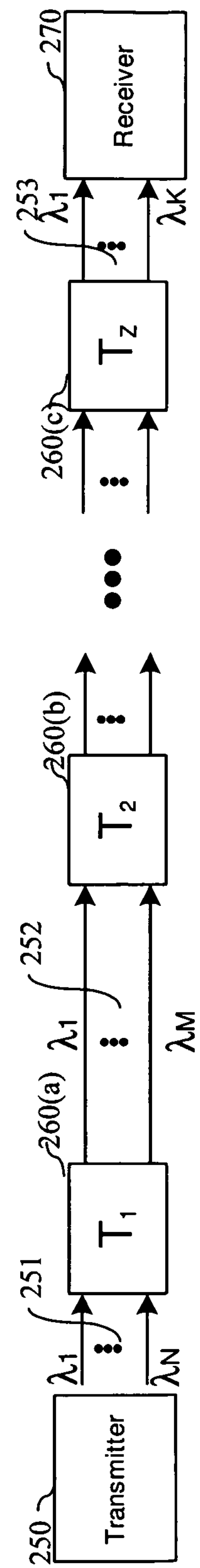
FIG. 2B is an illustration of a multi-link optical connection according to various embodiments of the invention.

FIG. 2B illustrates a sequence of multi-wavelength links according to various embodiments of the invention. As shown, a transmitter 250 communicates a VDS on a first set of wavelengths 251, which is received by a first transposition module 260(*a*). The VDS is communicated on a second set of wavelengths 252 (which may or may not be different than the first set) and received by a second transposition module 260(*b*). This process is continued until the VDS is transmitted from a last transposition module 260(*c*) on a final set of wavelengths 253 and received by a receiver 230.

A VDS may be transported over this sequence of multi-wavelength links such that wavelength distributions are performed by intermediary transposition function modules T1 . . . Tz 260(*a-c*). On each transmission section ("hop") between the transposition function modules 260 (*a-c*), the number of wavelengths employed may be the same or different, as long as the aggregate bandwidth is enough to support the VDS. This transposition may be performed at a wavelength granularity or at a bit granularity within a channel.

A. Transposition Considerations Based on Methods of VDS Distribution Across Wavelengths The VDS may be distributed across multiple wavelengths $\lambda_1$ through $\lambda_N$ by various methods in accordance with the present invention. Examples of some of these methods are described below.

Figure 3:
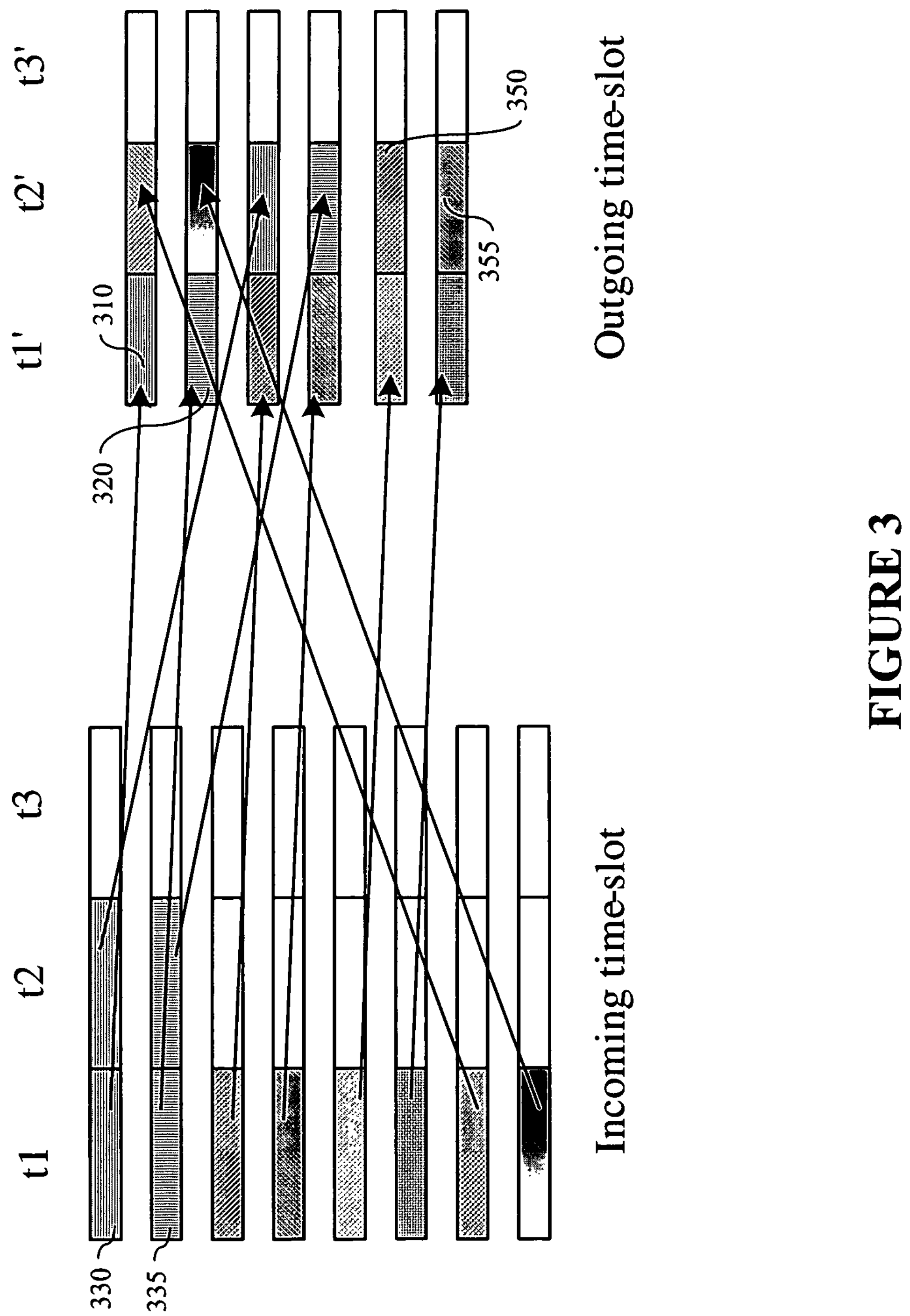
FIG. 3 is a diagram of transposition mapping between ingress wavelengths and egress wavelengths according to various embodiments of the invention.

FIG. 3 illustrates a fixed time-slot distribution according to various embodiments of the invention. A VDS may be transposed, meaning distributed from one set of wavelength channels to another set of wavelength channels, using this fixed time-slot distribution, in which sequential units of data composing the VDS are placed in a set of channels according to temporal locations ("time slots") on each of ingress wavelength channels 1 through N. Similarly, bits composing the VDS are placed in temporal locations on the egress wavelengths $\lambda_1$ through $\lambda_M$. For example, a subdivision of the VDS consisting of a fixed number of bits 330 may be placed on channel 1 in timeslot $t_1$ 310; the next number of bits 335 placed on channel 2 in timeslot $t_1$ 320, and so on in sequence. Non-correlated data is shown in bit slots 350 and 355, which do not relate to data in the VDS.

This type of allocation may be used, for example, if the VDS is "transparent." In other words, referring to FIG. 2A, the transposition function module 210 is unaware of any data boundaries that exist within the VDS, which might occur, for example, when the VDS has been encrypted in order to obscure data boundaries or if the complexity incurred in the transposition function module 210 by the need to detect data boundaries is undesirable. Another example includes data that lends itself to fixed bandwidth increments, for example pulse code modulation ("PCM") voice communications.

When the incoming and outgoing VDS mapping is performed according to a fixed time-slot distribution, the transposition function module 210 may operate, for example, by setting up an association between a regular group of incoming time-slots or channels to a regular group of outgoing time-slots or channels. In this example, time-slots are mapped in sequence from each sequential timeslot in a, channel on the ingress wavelengths to the next available timeslot in a channel on the egress wavelengths.

If there is a difference in delay on the propagation paths on the ingress channels 1 through 80, then a mechanism may be employed by the transposition function module 210 to recognize and compensate for the delay difference such that the association amongst temporal locations on the various wavelengths may be re-constructed (this process is called "skew compensation"). For example, additional data (overhead) may be added, at intervals, to the bit stream on each channel that uniquely identifies a temporal reference point within the bit stream. These reference points are then re-associated at the transposition function module 210. The positions of the data units on each wavelength with respect to the reference points are known, therefore the relative positions of the data units are known and the original sequence or organization of the data can be recovered by the transposition function module 210.

A VDS may alternatively be transposed using cell or packet distribution in which data units of fixed cells or variable length packets making up the VDS are variably assigned to channels 1 through N. The distribution method may depend upon characteristics of the data cells or packets, such as data length or amount of data contained in the various packets and also the packet transmission/arrival rate.

Assignment methods of the cells or packets may be designed such that a minimum amount of cell or packet storage/buffering is required in the operations performed by the transposition function module 210. The assignment methods may also be designed to enable the maximum use of the overall bandwidth supplied by the egress wavelength channels 1 through M. Additionally, the assignment methods may be designed so that the overall or worst-case transit delay through the transposition function module 210 is minimized. One skilled in the art will recognize that other factors, or combinations of the above-described factors, may be used in designing assignment methods of cell or packets.

Depending upon the method for distributing bandwidth amongst the ingress wavelength channels, various types of transposition function modules 210 may be used. For example, the methods may take into account the possibility that portions of the VDS assigned to different channels may propagate at different speeds in the transmission medium.

If there is a difference in delay on the propagation paths for channels 1 through N, then the packets or cells traveling in different channels 1 through N may arrive in a different order from that in which they were transmitted. In certain embodiments of the invention, the transposition function module 210 is able to recognize and reassemble the packets/cells in the correct order before retransmission on to channels 1 through M. This reassembly may be performed by re-sequencing the packets from the ingress wavelength channels together into a single serial stream.

It may also be necessary to reconstruct the correct order for the VDS as a whole or it may only be required to reconstruct the order for individual "conversations" within the VDS. A conversation is a unidirectional or bi-directional stream of packets/cells between individual logical entities for which the packet/cell order is preserved within the stream. The VDS may be made up of a single conversation or multiple conversations that have been multiplexed before transmission.

Regarding the concatenated links/transposition function modules 260(*a-c*), the packet order may be reconstructed at each transposition function module T1 . . . Tz 260(*a-c*), may be reconstructed at the end receiver 270, or may be reconstructed at some group of transposition function modules whereas others do not reconstruct the order. The location of the packet/cell reconstruction function may be chosen in order to optimize the location of data storage (called "buffering"), or for other considerations known to one of skill in the art. Buffering may be required in order to temporarily store cells/packets that have arrived in advance of their proper position in the retransmission sequence.

When the packet/cell order is reconstructed, the original sequence identifiers may be preserved, or new sequence identifiers may be originated at that transposition function module 210. Also, sequence identifiers may be applied to the VDS in its entirety, or may be applied individually to conversations. In either case, the correct packet/cell order within each conversation may be accurately recovered by the receiving transposition function module 210 and/or the end receiver 270.

B. Combination of the Transposition Function Module with Other Functions

In the description above, the transposition function module 210 is described as a standalone entity. However, it may be combined with other functions such as switching of the entire VDS or portions of the VDS.

Figure 4:
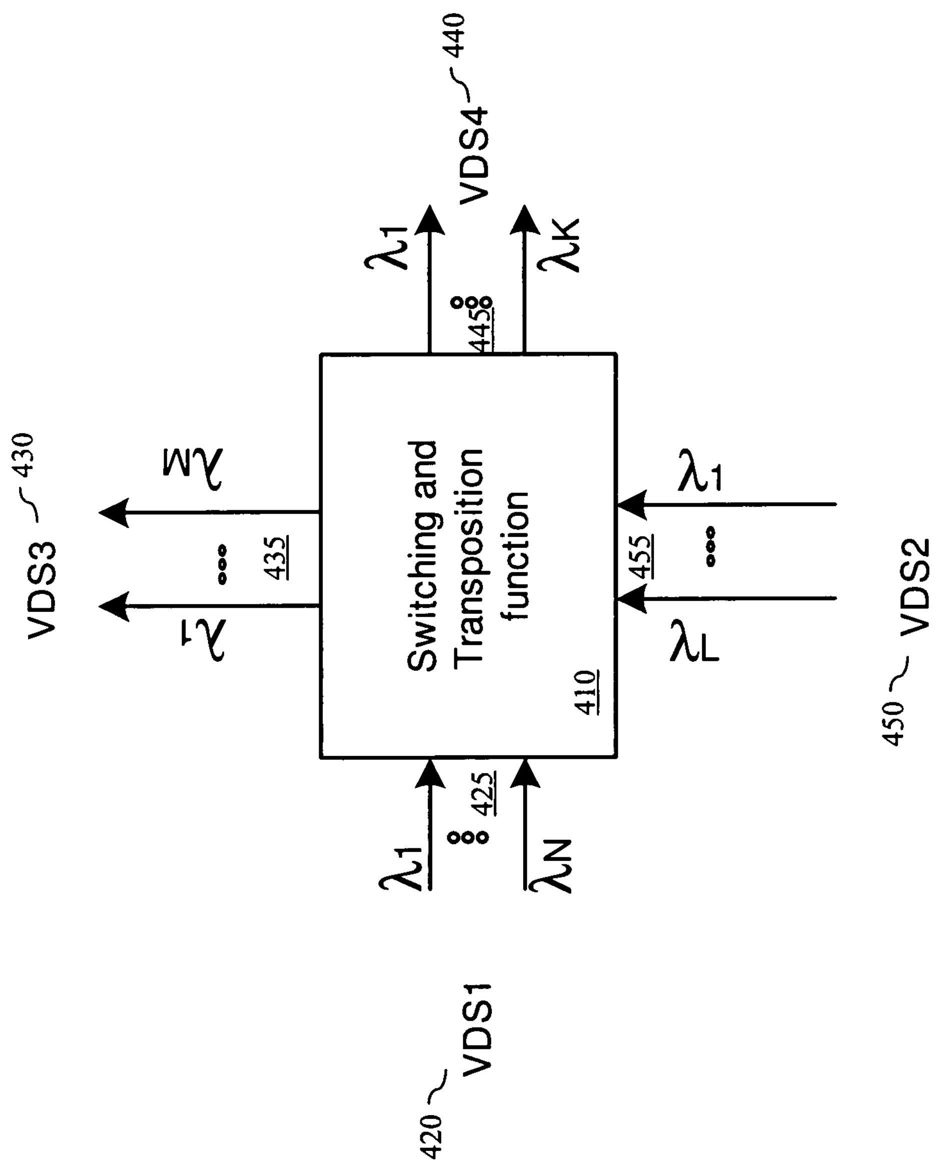
FIG. 4 is a general illustration of a switching and transposition function module according to various embodiments of the invention.

FIG. 4 shows an exemplary combined switching and transposition function module according to various embodiments of the invention. The switching and transposition function module 410 comprises a first set of interfaces 425 on which a first VDS 420 is received, a second set of interfaces 455 on which a second VDS 450 is received, a third set of interfaces 435 on which a third VDS 430 is transmitted and a fourth set of interfaces 445 on which a fourth VDS 440 is transmitted. In other embodiments, the second set of interfaces 455 or fourth set of interfaces 445 may not be present on the switching and transposition function module 410.

The switching and transposition function module 410 is capable of connecting all or a portion of each incoming VDS (VDS1 420, VDS2 450) to each outgoing VDS (VDS3 430, VDS4 440) in accordance with various embodiments of the present invention. In the process of re-directing portions of the incoming VDS to the outgoing VDS, the outgoing VDS is transposed in such a way that it can be supported by the outgoing number of wavelengths and rate.

In various embodiments of the invention, the switching function may accommodate any number of incoming/outgoing VDS's. Furthermore, an incoming and outgoing VDS could be associated and essentially create a bi-directional VDS. The switching function may be integrated as a circuit switch in which predefined information is switched between interfaces or may function as a packet switch in which a packet is switched relative to switching information contained within the packet itself.

One skilled in the art will recognize that other functionality may be integrated with a transposition function module.

The description above discusses multiple wavelengths on the same optical facility as making up the VDS; however, the various signals making up the VDS could also be transported alone or in groups on multiple optical facilities or electrical facilities. In this case, differential delay or skew considerations may be addressed, not only for the various propagation speeds in the media, but also potentially for various lengths of the media supporting the VDS.

a) Capabilities and Fault Signaling

Figure 5:
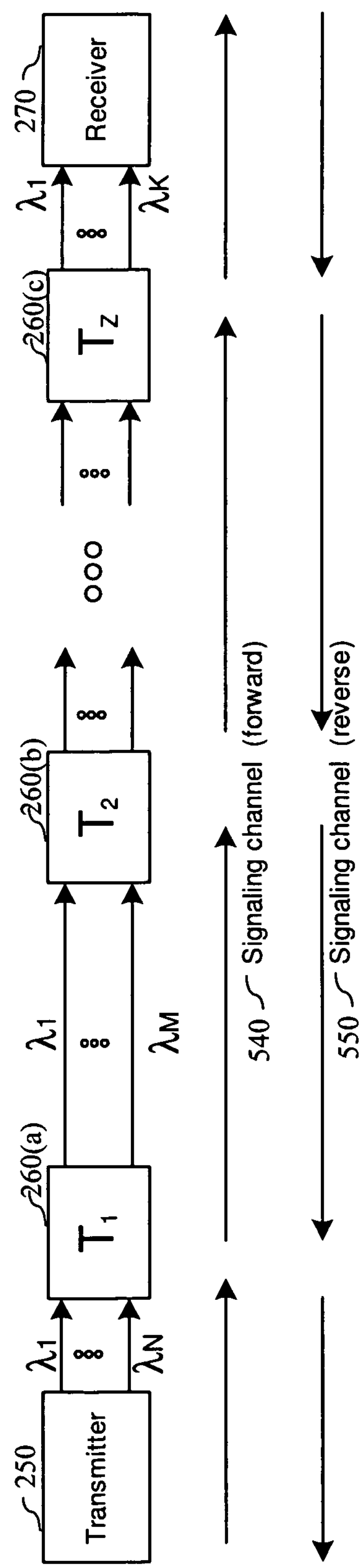
FIG. 5 is an illustration of forward and reverse signaling channels within a multi-link optical connection according to various embodiments of the invention.

For a single hop or multiple hop concatenation of transposition function modules/links, such as shown in FIG. 2B, an accompanying data channel for signaling may be provided. FIG. 5 illustrates the use of signaling channels within a multi-hop link according to various embodiments of the invention.

A signaling channel communicates information relevant to the management of the multi-hop link to control the operation of the transposition function modules 260(*a-c*) within the link and is communicated on a signal channel interface(s) on the modules. This control information may be used to manage the transposition function modules 260(*a-c*) at a network level or allow local management based on information derived external to the module or node on which it resides.

The signaling channels may be either a forward signaling channel 540 or a reverse signaling channel 550. These channels may be controlled and created in multiple ways, including but not limited to:

(1) carried as a portion of the bandwidth on one or more wavelengths transporting the VDS;

(2) carried as a separate wavelength on the same optical facility;

(3) carried in a separate optical or electrical facility;

(4) carried in a separate portion of the network, not necessarily associated with the transport path transporting the VDS.

In various embodiments of the invention, the transmitter 250 and/or the multiple transposition function modules 260 (*a-c*) may add data to the signaling channel in the forward direction 540. The transposition function modules 260(*a-c*) may receive data from the forward channel 540. Similarly, the receiver 270 and multiple transposition function modules 260(*a-c*) may add data to the reverse channel 550 and the transmitter 250 and transposition function modules 260(*a-c*) may receive data from the reverse channel 550.

The forward and/or reverse channels 540, 550 may be used to establish and set the parameters of the VDS and to communicate the real-time and accumulated performance of each hop of the VDS as well as the end-to-end VDS. The forward and/or reverse channels 540, 550 may also be used to communicate the existence or absence of malfunctions and/or failures of the wavelength transmitters and receivers, the optical/electrical facilities, and of the transposition function modules 260(*a-c*) themselves, along with other functions.

Examples of functionality for the signaling channels include, but are not limited to, the following:

The failure or suboptimal performance of one or more of the wavelengths on a given hop might be reported via the reverse channel 550 to the transmitter 250. The transmitter 250 could then respond by re-routing all or a portion of the VDS (via a switch) to a different path in the network.

The failures or suboptimal performance of one or more of the wavelengths could be reported via the forward or reverse channels 540, 550 for the purposes of reporting, so that corrective action can be taken.

The capabilities of the various links and transposition function modules can be negotiated amongst the various components at the establishment of the VDS. For example, the overall capability of the end-to-end VDS may be limited by the available bandwidth on one particular hop. This limited capability could be communicated to the transmitter 250 so that the transmitter 250 can scale the overall bandwidth of the VDS that is originated (again by prioritization) so that it does not exceed the bandwidth of that particular bandwidth constrained hop.

The performance, capability and/or fault information collected by the forward and/or reverse channel 540, 550 can be provided by the transmitter and/or receiver to a higher-layer system that establishes communication paths through a network. The higher-layer system, furnished with this information, can use the information to create optimal paths for information through the network in a global fashion.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

What is claimed is:

1. A communication node, comprising:

a plurality of ingress interfaces that receives a first ingress channel and a second ingress channel, the first ingress channel carrying a first set of data as a first bit stream and the second ingress channel carrying a second set of data as a second bit stream, the first and second sets of data being correlated to each other, such that the first set of data and the second set of data are associated with the same data stream, the first bit stream including first overhead data and the second bit stream including second overhead data;

a plurality of egress interfaces that transmits a first egress wavelength channel and a second egress wavelength channel; and a processor circuit, coupled between the plurality of ingress interfaces and the plurality of egress interfaces, the processor circuit being configured to map a first portion of the first set of data into the first egress wavelength channel and a second portion of the first set of data into the second egress wavelength channel, to thereby compensate for a skew between the first and second sets of data based on the first overhead data in the first bit stream and the second overhead data in the second bit stream, wherein the processor circuit is further configured to map a first portion of the second set of data into the first egress wavelength channel and a second portion of the second set of data into the second egress wavelength channel.

2. The communication node in accordance with claim 1, wherein the first egress channel is a first optical channel having a first wavelength and the second egress is a second optical channel having a second wavelength different than the first wavelength.

3. The communication node of claim 1 wherein the first egress channel comprises a non-correlated data portion which is unrelated to the first and second sets of data.

4. The communication node of claim 3 wherein the first egress wavelength channel is at full capacity during transmission of the first portion of the first set of data and the non-correlated data portion.

5. The communication node of claim 1 wherein the communication node includes a signaling channel interface that receives a forward signaling channel.

6. The communication node of claim 1 wherein the communication node includes a signaling channel interface that receives a reverse signaling channel.

7. A multi-link optical connection comprising:

a transmitter that transmits a first set of data as a first bit stream on a first optical signal having a first wavelength and a second set of data as a second bit stream on a second optical signal having a second wavelength, the first and second sets of data being correlated, such that the first set of data and the second set of data are associated with the same data stream, the first bit stream including first overhead data and the second bit stream including second overhead data;

an intermediary node that is coupled to receive the first and second wavelengths and comprises a transposition function module that maps a portion of the first set of data to a third optical signal having a third wavelength and a portion of the second set of data to a fourth optical signal having a fourth wavelength, the first wavelength being different than the third wavelength, and the second wavelength being different from the fourth wavelength, the transposition module compensating for a skew between and the first and second sets of data based on the first overhead data in the first bit stream and the second data in the second bit stream; and a receiver that is coupled to receive the third and fourth optical signals and that assembles the first set of data and the second set of data into a client signal using a correlation between the first and the second overhead data, wherein the transmitter transmits a signaling channel that provides control information related to the first and second sets of data to the intermediary node and the receiver.

8. The multi-link optical connection of claim 7 wherein the signaling channel is a bandwidth portion of the first and third wavelengths.

9. The multi-link optical connection of claim 7 wherein the signaling channel has a fifth wavelength.

10. The multi-link optical connection of claim 7 wherein the signaling channel is a forward signaling channel or a reverse signaling channel.

11. The multi-link optical connection of claim 7 wherein the signaling channel provides information related to a failure or suboptimal performance of a component within the connection.

12. The multi-link optical connection of claim 7 wherein the signaling channel provides information related to the transposition function module to other components within the connection.

13. The multi-link optical connection of claim 7 wherein the transposition function module is integrated with a switch on the intermediary node.

14. A method for transposing a first correlated set of wavelengths to a second correlated set of wavelengths, the method comprising:

receiving a plurality of ingress wavelength channels, the plurality of ingress wavelength channels corresponding to the first correlated set of wavelengths, a first one of the correlated set of wavelengths carrying a first set of data as a first bit stream and a second one of the correlated set of wavelengths carrying a second set of data as a second bit stream, the first and second sets of data being correlated with each other, such that the first set of data and the second set of data are associated with the same data stream, the first bit stream including first overhead data and the second bit stream including second overhead data;

mapping the plurality of ingress wavelength channels to a plurality of egress wavelength channels, the mapping is in accordance with a time-slot relationship between at least one ingress wavelength channel in the plurality of ingress wavelength channels and at least one egress wavelength channel in the plurality of egress wavelength channels;

transmitting the plurality of egress wavelength channels, the plurality of egress wavelength channels corresponding to the second correlated set of wavelengths; and compensating for a skew between the first and second sets of data based on the first overhead data in the first bit stream and the second overhead data in the second bit stream, wherein a first portion of a first ingress wavelength channel in the plurality of ingress wavelength channels is mapped to a first egress wavelength channel in the plurality of egress wavelength channels and a second portion of the first ingress wavelength channel is mapped to a second egress wavelength channel in the plurality of egress wavelength channel.

15. The method of claim 14 wherein the at least one egress channel further comprises non-correlated data that is not part of the first correlated set of wavelengths.

16. The method of claim 14 wherein the mapping of the plurality of ingress wavelength channels to the plurality of egress wavelength channels is at least partially controlled in response to information received on a signaling channel.

* * * * *